US009718331B2

United States Patent
Maruyama et al.

(10) Patent No.: US 9,718,331 B2
(45) Date of Patent: Aug. 1, 2017

(54) VEHICLE DOOR STRUCTURE

(71) Applicant: KABUSHIKI KAISHA TOYOTA JIDOSHOKKI, Aichi (JP)

(72) Inventors: Katsuya Maruyama, Aichi (JP); Hiroshi Kuno, Aichi (JP)

(73) Assignee: KABUSHIKI KAISHA TOYOTA JIDOSHOKKI, Aichi (JP)

(*) Notice: Subject to any disclaimer, the term of this patent is extended or adjusted under 35 U.S.C. 154(b) by 0 days.

(21) Appl. No.: 15/066,341

(22) Filed: Mar. 10, 2016

(65) Prior Publication Data

US 2016/0272053 A1 Sep. 22, 2016

(30) Foreign Application Priority Data

Mar. 19, 2015 (JP) .................. 2015-056761

(51) Int. Cl.
*E05F 11/00* (2006.01)
*B60J 5/04* (2006.01)
(Continued)

(52) U.S. Cl.
CPC .............. *B60J 5/047* (2013.01); *B60J 5/06* (2013.01); *E05B 83/40* (2013.01); *E05C 17/60* (2013.01);
(Continued)

(58) Field of Classification Search
CPC ......... B60J 5/047; B60J 5/06; E05D 15/0604; B60Y 2304/05; B60Y 2304/03; E05Y 2900/531
(Continued)

(56) References Cited

U.S. PATENT DOCUMENTS 3,100,667 A * 8/1963 Schwenk ................. B60J 5/062
49/214
4,110,934 A * 9/1978 Zens ..................... E05D 15/101
296/155
(Continued)

FOREIGN PATENT DOCUMENTS

EP 1 780 354 5/2007
EP 2 689 948 1/2014
(Continued)

OTHER PUBLICATIONS

Extended European Search Report for EP Appl. No. 16158902.3 dated Aug. 5, 2016.
(Continued)

*Primary Examiner* — Jerry Redman
(74) *Attorney, Agent, or Firm* — Greenblum & Bernstein, P.L.C.

(57) ABSTRACT

Provided is a vehicle door structure that enables manufacturing cost reduction and weight reduction. A vehicle door structure 1 includes a lock mechanism 40. The lock mechanism 40 locks sliding of a slide door 6 in a fully closed position in which the slide door 6 closes a door opening portion 4 and in a fully open position in which the slide door 6 fully opens the door opening portion 4. The lock mechanism 40 includes the portion to be locked 50 provided to the guided body 18 and the locking portions 60 and 70 provided to the slide rail 17. The portion to be locked 50 protrudes toward the locking portions 60 and 70 and is locked by the locking portions 60 and 70 in the fully closed position or the fully open position.

5 Claims, 9 Drawing Sheets

(51) Int. Cl.
*B60J 5/06* (2006.01)
*E05C 17/60* (2006.01)
*E05D 15/10* (2006.01)
*E05D 15/06* (2006.01)
*E05B 83/40* (2014.01)

(52) U.S. Cl.
CPC ......... *E05D 13/04* (2013.01); *E05D 15/0604* (2013.01); *E05D 15/1047* (2013.01); *B60Y 2304/03* (2013.01); *B60Y 2304/05* (2013.01); *E05Y 2900/531* (2013.01)

(58) Field of Classification Search
USPC .......................................................... 49/360
See application file for complete search history.

(56) References Cited

U.S. PATENT DOCUMENTS

| | | | |
|---|---|---|---|
| 4,569,553 A * | 2/1986 | Speth | B60J 5/06 296/155 |
| 4,872,287 A * | 10/1989 | Block | E05B 65/0823 16/87 R |
| 4,896,906 A * | 1/1990 | Weinerman | E05B 77/265 292/337 |
| 4,917,412 A * | 4/1990 | Swan | E05B 77/265 292/216 |
| 5,117,665 A * | 6/1992 | Swan | E05B 77/265 292/48 |
| 5,361,540 A * | 11/1994 | Rogers, Jr. | E05D 13/04 292/DIG. 46 |
| 5,481,830 A * | 1/1996 | Gooding | E05D 13/04 292/67 |
| 5,979,971 A * | 11/1999 | Mizuki | E05B 65/0811 292/219 |
| 5,983,568 A * | 11/1999 | Cianetti | A47F 3/0434 49/125 |
| 6,042,158 A * | 3/2000 | Horn | E05D 13/006 16/DIG. 20 |
| 6,135,513 A * | 10/2000 | Hamada | E05B 77/26 292/201 |
| 6,279,267 B1 * | 8/2001 | Barrett | E05D 13/04 49/221 |
| 7,114,753 B2 * | 10/2006 | Nodorft | E05B 47/0002 160/201 |
| 7,156,454 B1 * | 1/2007 | Dogan | B60J 5/06 16/83 |
| 7,422,268 B2 * | 9/2008 | Kothe | B60J 5/06 292/DIG. 23 |
| 7,641,261 B2 * | 1/2010 | Rusnak | E05D 15/101 296/155 |
| 7,654,608 B2 * | 2/2010 | Krajenke | E05D 15/101 296/155 |
| 7,669,367 B2 * | 3/2010 | Shimura | B60J 5/06 296/155 |
| 7,699,363 B2 * | 4/2010 | Langfermann | E05B 63/143 292/201 |
| 7,753,436 B2 * | 7/2010 | Kim | B60J 5/0487 296/155 |
| 7,934,767 B2 * | 5/2011 | Kim | B60J 5/062 296/155 |
| 8,328,270 B2 * | 12/2012 | Kitayama | B60J 7/192 296/146.1 |
| 8,567,126 B2 | 10/2013 | Hozumi et al. | |
| 8,713,852 B2 * | 5/2014 | Choi | E06B 3/46 296/146.11 |
| 8,776,434 B2 * | 7/2014 | Terasaki | B61D 19/026 49/116 |
| 8,807,626 B2 * | 8/2014 | Kwon | E05D 15/101 296/146.4 |
| 8,925,248 B2 * | 1/2015 | Maruyama | B60J 5/047 296/146.11 |
| 9,074,398 B2 * | 7/2015 | Maruyama | E05D 15/48 |
| 9,267,317 B2 * | 2/2016 | Vu | E05F 5/06 |
| 2007/0096504 A1 | 5/2007 | Kothe et al. | |
| 2014/0026487 A1 | 1/2014 | Maruyama et al. | |

FOREIGN PATENT DOCUMENTS

| | | |
|---|---|---|
| JP | 2010-47969 | 3/2010 |
| JP | 2011-46271 | 3/2011 |
| JP | 2011-148429 | 8/2011 |
| JP | 2014/024476 | 2/2014 |

OTHER PUBLICATIONS

U.S. Appl. No. 15/066,401 to Katsuya Maruyama et al., which was filed on Mar. 10, 2016.

Japanese Office Action in counterpart application No. P2015-056761 dated May 9, 2017.

* cited by examiner

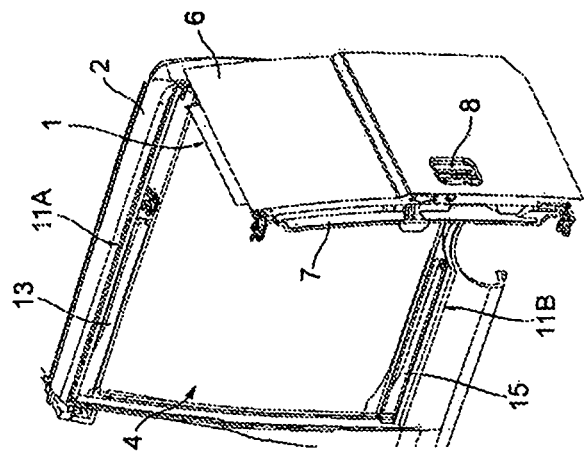
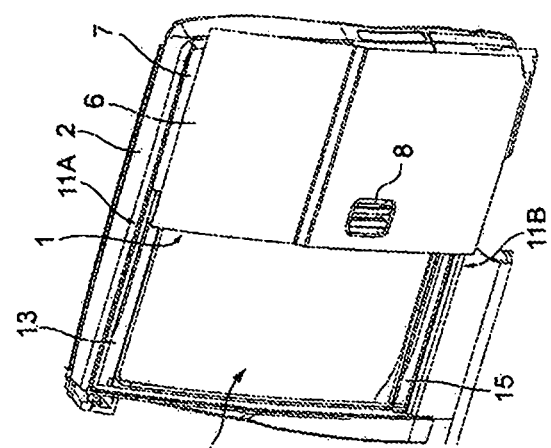
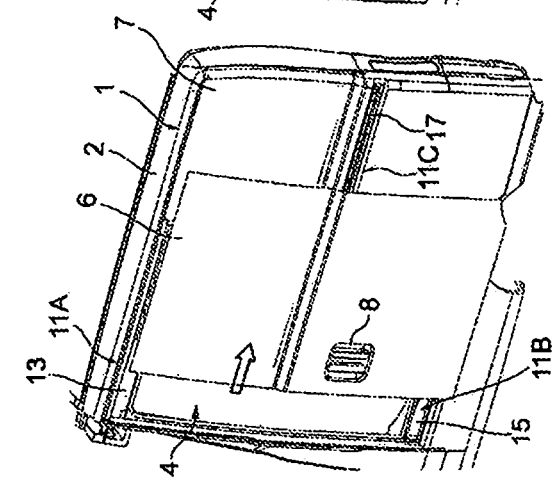

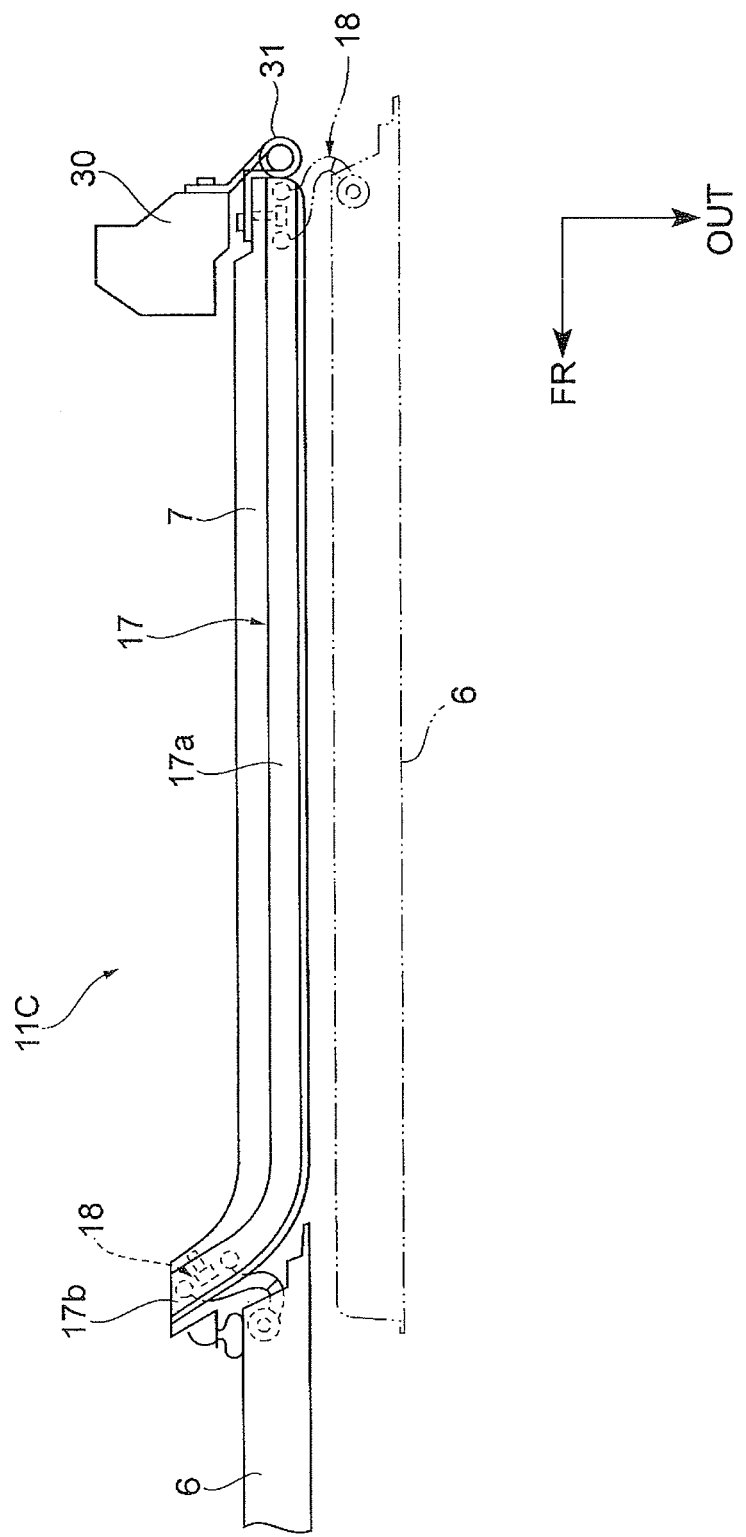

VEHICLE DOOR STRUCTURE

TECHNICAL FIELD

The present invention relates to a vehicle door structure.

BACKGROUND

As a conventional vehicle door structure, a structure described in Japanese Unexamined Patent Publication No. 2011-148429, for example, has been known. The vehicle door structure described in Japanese Unexamined Patent Publication No. 2011-148429 includes a slide door configured to open and close an opening portion formed on a side portion of a vehicle body, a slide mechanism configured to slide the slide door, a front door latch configured to lock the slide door at a closed position, and a rear door latch configured to lock the slide door at an open position.

SUMMARY

The above-described conventional vehicle door structure includes two lock mechanisms that are a mechanism configured to lock the slide door at the closed position and a mechanism configured to lock the slide door at the open position. The structure including two door lock mechanisms as described above uses a larger number of components, and accordingly has problems in that the manufacturing cost becomes higher and the weight increases.

An object of the present invention is to provide a vehicle door structure that enables manufacturing cost reduction and weight reduction.

A vehicle door structure according to an aspect of the present invention includes: a slide door configured to open and close a door opening portion formed on a vehicle body; and a slide mechanism including a slide rail provided extending in an opening/closing direction of the slide door and a guided body guided by the slide rail, the slide mechanism being configured to slide the slide door. The vehicle door structure further includes a lock mechanism configured to lock sliding of the slide door in a fully closed position in which the slide door closes the door opening portion and in a fully open position in which the slide door fully opens the door opening portion. The lock mechanism includes: a portion to be locked provided to the guided body; and two locking portions provided to the slide rail and each arranged at a position that corresponds to the portion to be locked when the slide door is positioned in the fully closed position or the fully open position. The portion to be locked protrudes toward one of the locking portions and is locked by the corresponding one of the locking portions in the fully closed position or the fully open position.

This vehicle door structure includes the lock mechanism that locks sliding of the slide door in the fully closed position and the fully open position of the slide door. The lock mechanism includes the portion to be locked provided to the guided body and two locking portions provided to the slide rail. The portion to be locked protrudes toward one of the locking portions and is locked by the corresponding one of the locking portions in the fully closed position or the fully open position. In the vehicle door structure, this configuration enables the slide door to be locked in the fully closed position and in the fully open position by the portion to be locked provided to the guided body and the two locking portions provided to the slide rail, even without providing individual lock mechanisms arranged in the fully closed position and the fully open position of the slide door and each containing a latch and a striker. Thus, in the vehicle door structure, the number of components can be reduced. Consequently, the manufacturing cost reduction and the weight reduction can be achieved. Conventionally, when the fitting position of the slide door with respect to the slide rail in the fully closed position is adjusted, adjustment of the guided body and adjustment of the lock and the striker are required. By contrast, in the vehicle door structure, adjustment is required only for the guided body, and thus the fitting position can be easily adjusted.

In one embodiment, the portion to be locked may include a member to be locked having a rod shape and provided so as to be capable of protruding and retracting and a biasing member configured to bias the member to be locked toward the locking portions. By this configuration, the member to be locked can be caused to protrude toward the locking portions, whereby engagement between the portion to be locked and each of the locking portions can be further ensured. Consequently, sliding of the slide door can be securely locked.

In one embodiment, the guided body may include a roller rotatably supported by a support member and configured to move along the slide rail. The member to be locked may be provided so that at least part of the member to be locked is positioned inside the support member and an extending direction of the member to be locked is aligned along a rotation axis of the roller, so as to be capable of protruding and retracting along the rotation axis. In this configuration, the position of the guided body in the slide rail is regulated by the roller. This can reduce variations in relative position between the portion to be locked and each of the locking portions. Thus, the portion to be locked and each of the locking portions can be securely engaged together, so that sliding of the slide door can be securely locked.

In one embodiment, the portion to be locked may retract in accordance with operation of an operating portion configured to control opening and closing of the slide door and be released from a locked state with each of the locking portions. This enables locking of sliding of the slide door to be released by operating the operating portion such as a handle.

In one embodiment, the slide door may open and close one partial area of the door opening portion, the vehicle door structure may further include a swing door configured to open and close the other partial area of the door opening portion together with the slide door that is in the fully open position, and the slide rail may be arranged on the swing door. In this configuration including the swing door, the swing door is opened in the fully open position of the slide door. This requires sliding of the slide door to be restricted in the open state of the swing door. In the vehicle door structure, even with a configuration including the swing door, the sliding in the open state of the swing door can be locked by the lock mechanism.

According to the present invention, the cost reduction and the weight reduction can be achieved.

BRIEF DESCRIPTION OF THE DRAWINGS

FIG. 2A is a perspective view illustrating a state in which a slide door is opened, FIG. 2B is a perspective view illustrating a fully open state of the slide door, and FIG. 2C is a perspective view illustrating a state in which a swing door is opened;

FIG. 3 is a plan view illustrating a slide support mechanism depicted in FIG. 1 with the slide door and the swing door;

DETAILED DESCRIPTION

Preferred embodiments of the present invention will now be described in detail with reference to the attached drawings. In the description of the drawings, like or equivalent elements are designated by like numerals, and duplicated description is omitted. In the following description, the longitudinal direction, width direction, and height direction of a vehicle (automobile) 100 are defined as front-and-rear direction, right-and-left direction, and up-and-down direction, respectively.

Figure 1:
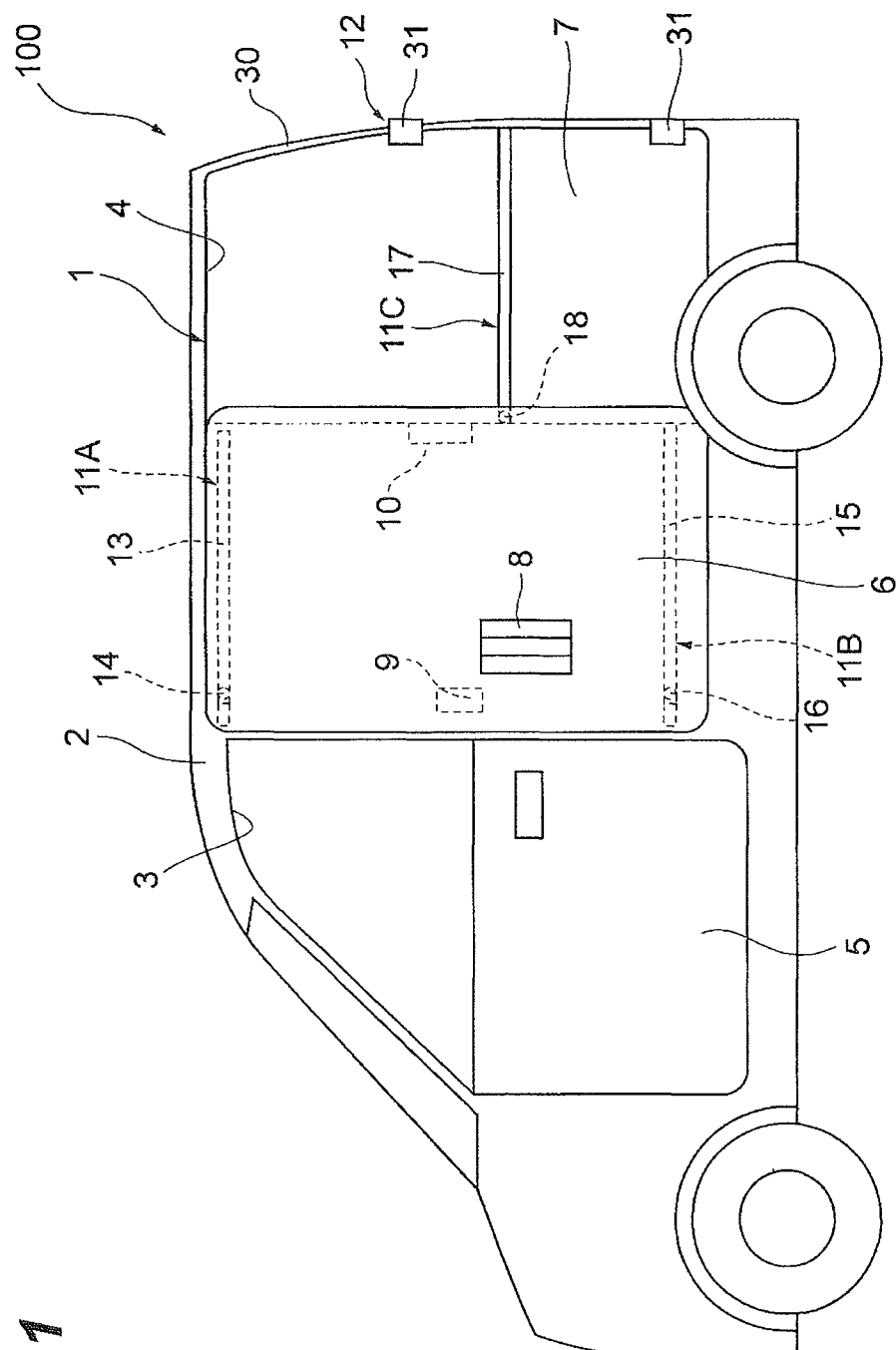
FIG. 1 is a side view of a vehicle including a vehicle door structure according to one embodiment.

FIG. 1 is a side view of this vehicle including a vehicle door structure 1 according to one embodiment. As depicted in FIG. 1, the vehicle 100 is provided with the vehicle door structure 1. In the present embodiment, the vehicle door structure 1 is provided to a side portion of a vehicle body 2. On the side portion of the vehicle body 2, a front door opening portion 3 positioned at a side of a front seat and a rear door opening portion 4 positioned at a side of a luggage compartment arranged behind the front seat are formed. The front door opening portion 3 is opened and closed by a front door 5.

FIG. 2A is a perspective view illustrating a state in which a slide door is opened. FIG. 2B is a perspective view illustrating a fully open state of the slide door. FIG. 2C is a perspective view illustrating a state in which a swing door is opened. The rear door opening portion 4 is opened and closed by this slide-openable slide door 6 and this swing-openable swing door 7. As depicted in FIG. 2A, the slide door 6 is configured to slidingly move in the longitudinal direction of the vehicle body 2 so as to open and close a front area (one partial area) of the rear door opening portion 4. As depicted in FIG. 2B, the slide door 6 is positioned outside the swing door 7 to overlap the swing door 7 when the slide door has been fully opened.

As depicted in FIG. 2C, the swing door 7 is configured to pivotally rotate with respect to the vehicle body 2 when the slide door 6 is fully opened so as to open and close a rear area (the other partial area) of the rear door opening portion 4 together with the slide door 6.

On an outer front part of the slide door 6, a slide-door outer door handle (operating portion) 8 for opening and closing the slide door 6 is provided. On an inner front part of the slide door 6, a slide-door inner door handle (operating portion) 9 for opening and closing the slide door 6 is provided. On a front end of the swing door 7, a swing door handle 10 for opening and closing the swing door 7 is provided.

The vehicle door structure 1 includes slide support mechanisms (slide mechanism) 11A, 11B, and 11C slidably supporting the slide door 6 in the longitudinal direction of the vehicle body 2 and a pivotal support mechanism 12 pivotally supporting the swing door 7 with respect to the vehicle body 2.

The slide support mechanism 11A includes an upper slide rail 13 provided on an upper part of the vehicle body 2 and extending in the longitudinal direction of the vehicle body 2 and a guided body 14 provided on a front upper part of the slide door 6 and configured to be guided by the upper slide rail 13 when the slide door 6 is opening and closing. In the fully open state (fully open position) in which the slide door 6 has been fully opened, the guided body 14 is separated from the upper slide rail 13 to be movable in the vehicle width direction. The slide support mechanism 11B includes a lower slide rail 15 provided on a lower part of the vehicle body 2 and extending in the longitudinal direction of the vehicle body 2 and a guided body 16 provided on a front lower part of the slide door 6 and configured to be guided by the lower slide rail 15 when the slide door 6 is opening and closing. In the fully open state in which the slide door 6 has been fully opened, the guided body 16 is separated from the lower slide rail 15 to be movable in the vehicle width direction.

FIG. 3 is a plan view illustrating the slide support mechanism 11C depicted in FIG. 1 with the slide door 6 and the swing door 7. As depicted in FIG. 3, the slide support mechanism 11C includes a middle slide rail 17 provided near a central part of the swing door 7 and extending in the longitudinal direction of the swing door 7 and a guided body 18 provided at a rear end of the slide door 6 and configured to be guided by the middle slide rail 17 when the slide door 6 is opening and closing. The middle slide rail 17 includes a main rail portion 17a extending in the longitudinal direction (sliding direction of the slide door 6) of the vehicle body in the fully closed state of the swing door 7 and a bent rail portion 17b that is bent inward from a front end of the main rail portion 17a (end on a side corresponding to a closing direction of the slide door 6). The bent rail portion 17b is obliquely bent inward and forward of the main rail portion 17a.

Figure 4:
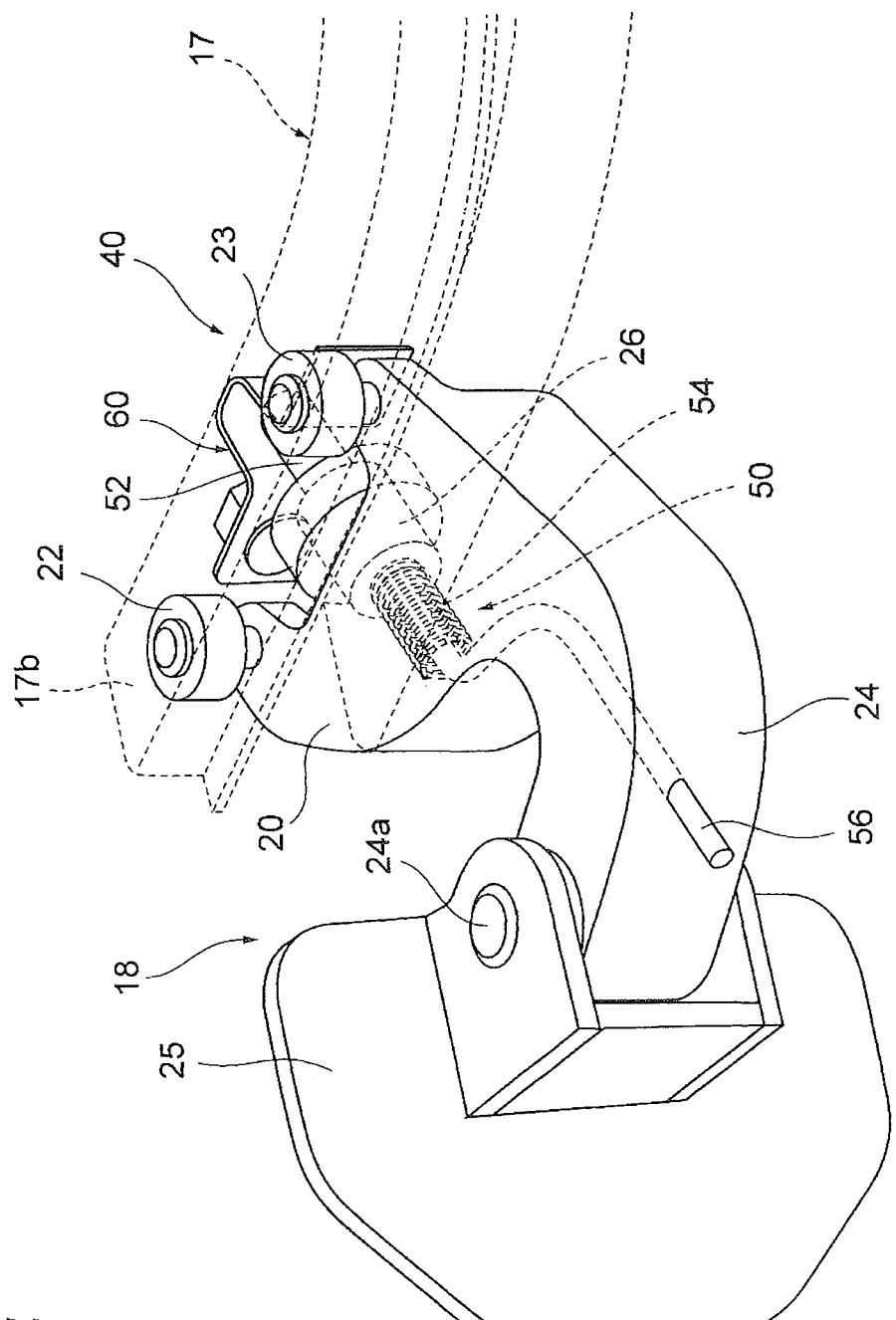
FIG. 4 is a perspective view illustrating a guided body and a slide rail.
Figure 5:
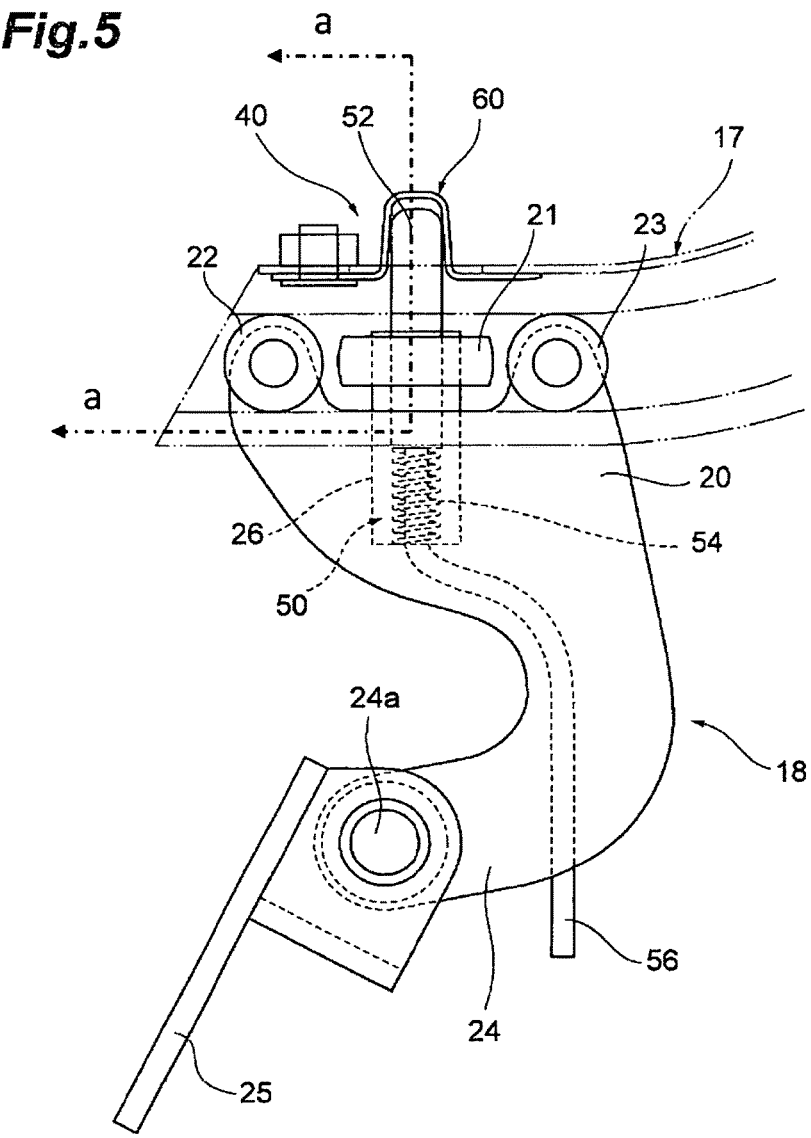
FIG. 5 is a plan view illustrating the guided body and the slide rail.

FIG. 4 is a perspective view illustrating the guided body and the slide rail. FIG. 5 is a plan view illustrating the guided body and the slide rail. As depicted in FIG. 4 and FIG. 5, the guided body 18 includes a main body portion 20, a vertical roller 21 configured to move along the middle slide rail 17, a pair of front and rear horizontal rollers 22 and 23 configured to move along the middle slide rail 17, an arm portion 24, and a base portion 25. The main body portion 20 rotatably supports the vertical roller 21 and the horizontal rollers 22 and 23.

The vertical roller 21 is arranged between the horizontal rollers 22 and 23. The vertical roller 21 is rotatably supported by a support member 26 provided to the main body portion 20. The support member 26, having a cylindrical shape, has a hollow portion 26a (see FIG. 7). The vertical roller 21 is externally provided to the support member 26, and rotates about a rotation axis L that is the same axis as the central axis of the support member 26.

The horizontal rollers 22 and 23 restrict movement of the vertical roller 21 in a direction parallel to the rotation axis L (width direction of the vehicle body 2 in the present embodiment) in the middle slide rail 17. Specifically, the horizontal rollers 22 and 23 are in contact with a side surface 17c and a side surface 17d (see FIG. 7) of the middle slide rail 17 positioned on both sides of the horizontal rollers 22 and 23 and therefore restricted in the motion in the width direction of the vehicle body 2.

The arm portion 24 is formed integrally with the main body portion 20. The arm portion 24 connects the main body portion 20 to the base portion 25. The base portion 25 is fixed inside the slide door 6. The arm portion 24 is provided onto the base portion 25 pivotally about a shaft 24a extending along the height direction of the vehicle body 2.

The pivotal support mechanism 12 includes a hinge 31 that pivotally couples the swing door 7 to a rear pillar 30 provided to a rear end of the vehicle body 2. The hinge 31 is provided in plurality, for example, two spaced apart in the up-and-down direction.

In the present embodiment, the vehicle door structure 1 includes a lock mechanism 40. The lock mechanism 40 locks sliding of the slide door 6 in a fully closed position in which the slide door 6 closes the front area of the rear door opening portion 4 and in a fully open position in which the slide door 6 fully opens the front area of the rear door opening portion 4. The lock mechanism 40 includes a portion to be locked 50 and two locking portions 60 and 70.

The portion to be locked 50 is provided to the guided body 18. The portion to be locked 50 includes a lock pin (member to be locked) 52, a spring (biasing member) 54, and a linkage member 56.

Figure 7:
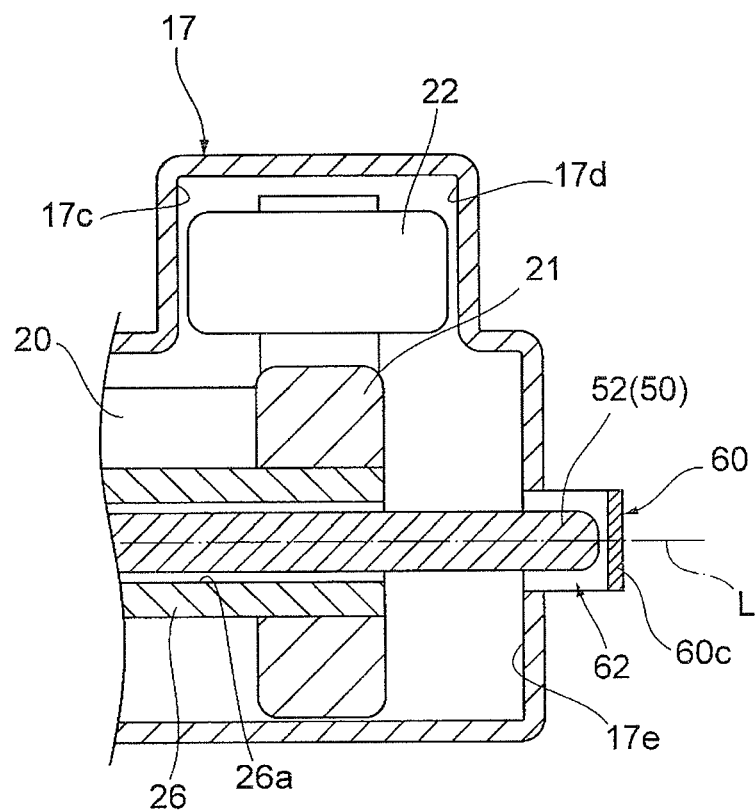
FIG. 7 is a sectional view along line a-a in FIG. 5 illustrating a state in which a portion to be locked is locked by the locking portion.

The lock pin 52 is a rod-like (cylindrical) member that is locked by the locking portion 60 or 70. The lock pin 52 is preferably a member having high rigidity, for example, made of metal. Part of the lock pin 52 is positioned inside the support member 26 rotatably supporting the vertical roller 21. The lock pin 52 is inserted into the hollow portion 26a of the support member 26, and is arranged so that the extending direction of the lock pin 52 is aligned along the rotation axis L of the vertical roller 21. The lock pin 52 is provided so as to be capable of protruding and retracting along the rotation axis L of the vertical roller 21. In FIG. 7, a gap is formed between the outer circumferential surface of the lock pin 52 and the inner circumferential surface of the support member 26. In other words, the outer diameter of the lock pin 52 is smaller than the inner diameter of the support member 26. However, the outer circumferential surface of the lock pin 52 may be in contact with the inner circumferential surface of the support member 26. In other words, the outer diameter of the lock pin 52 and the inner diameter of the support member 26 may be substantially the same. A tip (end positioned on the side surface 17e side) of the lock pin 52 is chamfered, and thus has a round shape.

The spring 54 is a biasing member that biases the lock pin 52. The spring 54 is a coil spring, for example. The spring 54 is arranged at an end of the lock pin 52 on the opposite side to the tip thereof. The spring 54 biases the lock pin 52 toward the side surface 17e (see FIG. 7) of the middle slide rail 17. The lock pin 52 is always biased by the spring 54 toward the side surface 17e of the middle slide rail 17.

The linkage member 56 links the lock pin 52 to the slide-door outer door handle 8 and the slide-door inner door handle 9. The linkage member 56 is a wire, for example. When the slide-door outer door handle 8 or the slide-door inner door handle 9 is operated (opening operation is performed), the linkage member 56 pulls the lock pin 52 in a direction in which the lock pin 52 retracts (direction opposite to the direction biased by the spring 54). Consequently, the lock pin 52 is pulled out of an accommodating portion 62 of the locking portion 60 and thus released from locking with the locking portion 60.

These two locking portions 60 and 70 are arranged, in the middle slide rail 17, at positions that correspond to the portion to be locked 50 when the slide door 6 is in the fully closed position and in the fully open position. The locking portions 60 and 70 lock the lock pin 52 of the portion to be locked 50. The locking portion 60 is provided to the bent rail portion 17b of the middle slide rail 17. Specifically, the locking portion 60 is provided at a position that faces the lock pin 52 provided to the guided body 18 when the slide door 6 is in the fully closed position in which the slide door 6 closes the front area of the rear door opening portion 4. The locking portion 70 is provided to the main rail portion 17a of the middle slide rail 17. Specifically, the locking portion 70 is provided at a position that faces the lock pin 52 provided to the guided body 18 when the slide door 6 is in the fully open position in which the slide door fully opens the front area of the rear door opening portion 4. The locking portion 60 and the locking portion 70 have the same configuration. Thus, the following describes the locking portion 60 in detail as one example.

Figures 6A, 6B:
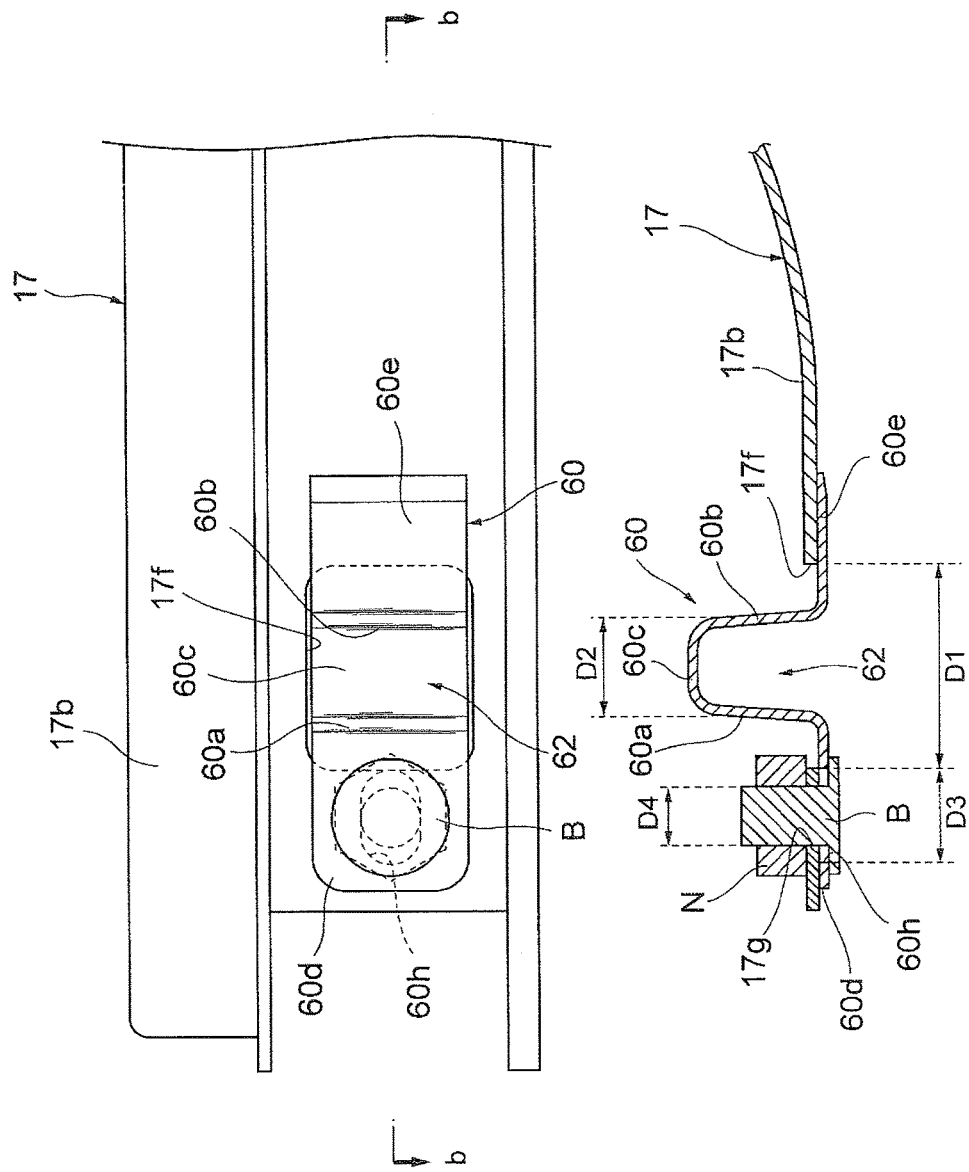
FIG. 6A is a diagram illustrating a state in which a locking portion is attached to a middle slide rail.
FIG. 6B is a sectional view along line b-b in FIG. 6A.

As depicted in FIGS. 6A and 6B, the locking portion 60 includes a pair of side portions 60a and 60b facing each other, a top portion 60c joining the pair of side portions 60a and 60b end to end, and flange portions 60d and 60e extending outward from the other ends of the side portions 60a and 60b in a manner substantially parallel to the top portion 60c. The pair of side portions 60a and 60b and the top portion 60c substantially form a U-shape. The locking portion 60 is formed by bending a metallic plate member, for example. On the locking portion 60, the accommodating portion 62 is formed by the pair of side portions 60a and 60b and the top portion 60c. The accommodating portion 62 accommodates the tip side of the lock pin 52 as depicted in FIG. 5. On the flange portion 60d, a through hole 60h is formed. The through hole 60h is a long hole that is long in the opposing direction of the pair of side portions 60a and 60b.

The locking portion 60 is attached to the middle slide rail 17. On the bent rail portion 17b of the middle slide rail 17, a mounting hole 17f having a substantially rectangular shape and a through hole 17g having a substantially circular shape are formed. The width D1 of the mounting hole 17f is larger than the distance D2 between the side portion 60a and the side portion 60b of the locking portion 60. Part (the side portions 60a and 60b and the top portion 60c) of the locking portion 60 is inserted into the mounting hole 17f from the inside of the middle slide rail 17. Consequently, the pair of side portions 60a and 60b and the top portion 60c of the locking portion 60 protrude from the middle slide rail 17. The flange portions 60d and 60e and the side surface 17e of the middle slide rail 17 are arranged facing each other. The through hole 60h formed on the flange portion 60d is positioned corresponding to the through hole 17g formed on the bent rail portion 17b.

The locking portion 60 is fixed on the middle slide rail 17 by a bolt B and a nut N. Specifically, the bolt B is inserted into the through hole 60h and the mounting hole 17f from the inside of the middle slide rail 17, and is fastened by the nut N arranged outside the middle slide rail 17. This fixes the locking portion 60 on the middle slide rail 17. Herein, the width D3 of the through hole 60h is larger than the width D4 of the bolt B, and the width D1 of the mounting hole 17f is larger than the distance D2 between the pair of side portions 60a and 60b. This allows the first locking portion 60 to be moved in the extending direction of the middle slide rail 17 with the bolt B being inserted into the through hole 60*h*. Thus, the attachment position of the locking portion 60 in the middle slide rail 17 is adjustable.

The locking portion 70 having the same configuration as that of the locking portion 60 is also attached to the main rail portion 17*a* of the middle slide rail 17 in the same manner as the locking portion 60.

Figure 8A:
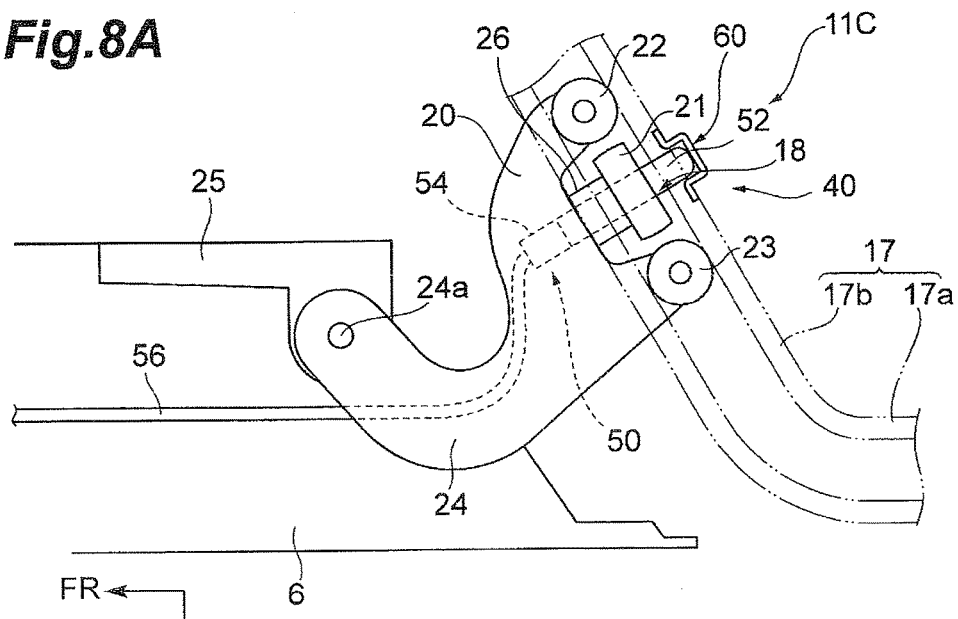
FIG. 8A is a diagram illustrating a state in which the portion to be locked is locked by the locking portion in a bent rail portion.

The following describes movement of the lock mechanism 40. Movement of the lock mechanism 40 when the state of the slide door 6 is changed from the fully closed state to the fully open state will be described first. As depicted in FIG. 8A, when the slide door 6 is in the fully closed position, the lock mechanism 40 locks sliding of the slide door 6. Specifically, the lock pin 52 of the portion to be locked 50 is inserted into the accommodating portion 62 of the locking portion 60 provided to the bent rail portion 17*b*. When the slide-door outer door handle 8 or the slide-door inner door handle 9 is operated, the linkage member 56 is pulled, and the linkage member 56 causes the lock pin 52 to retract. This pulls out the lock pin 52 from the accommodating portion 62 of the locking portion 60 to release the locking between the portion to be locked 50 and the locking portion 60, thereby allowing the slide door 6 to slide.

When the slide door 6 is slid, the lock pin 52 of the portion to be locked 50 slides while being pressed against the side surface 17*e* of the middle slide rail 17 by the spring 54. When the slide door 6 reaches the fully open position, the portion to be locked 50 is positioned facing the locking portion 70, and the lock pin 52 biased by the spring 54 protrudes toward the locking portion 70 to be inserted into the accommodating portion 62 of the locking portion 70. This locks sliding of the slide door 6 in the fully open position.

Figure 8B:
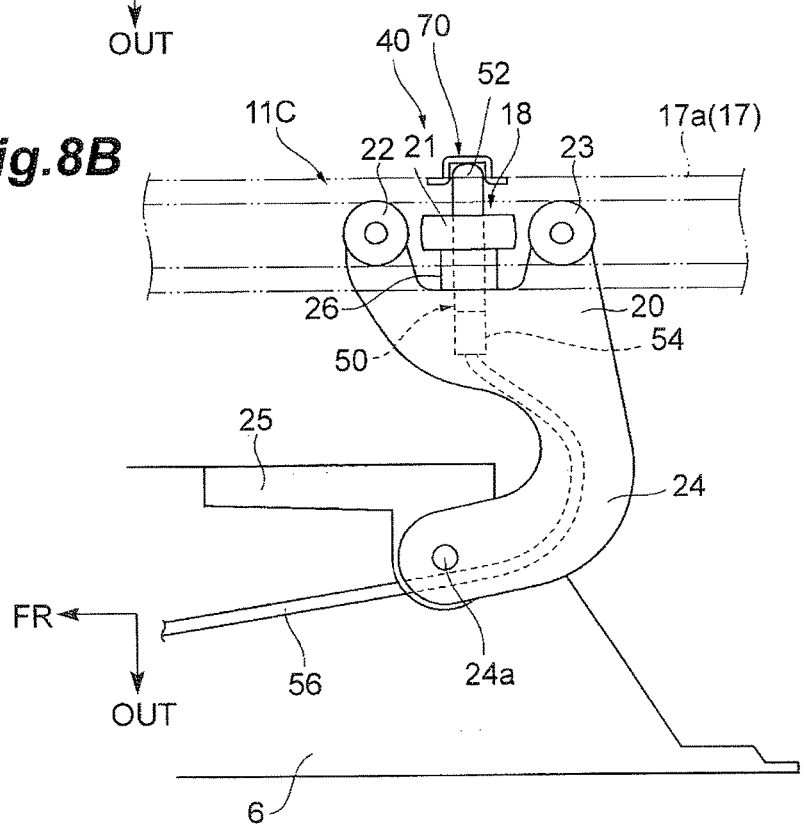
FIG. 8B is a diagram illustrating a state in which the portion to be locked is locked by the locking portion in a main rail portion.

The following describes movement of the lock mechanism 40 when the state of the slide door 6 is changed from the fully open state to the fully closed state. As depicted in FIG. 8B, the lock mechanism 40 locks sliding of the slide door 6 when the slide door 6 is in the fully open position. Specifically, the lock pin 52 of the portion to be locked 50 is inserted into the accommodating portion 62 of the locking portion 70 provided to the main rail portion 17*a*. When the slide-door outer door handle 8 or the slide-door inner door handle 9 is operated, the linkage member 56 is pulled, and the linkage member 56 causes the lock pin 52 to retract. This pulls out the lock pin 52 from the accommodating portion 62 of the locking portion 70 to release the locking between the portion to be locked 50 and the locking portion 70, thereby allowing the slide door 6 to slide.

When the slide door 6 is slid, the lock pin 52 of the portion to be locked 50 slides while being pressed against the side surface 17*e* of the middle slide rail 17 by the spring 54. When the slide door 6 reaches the fully closed position, the portion to be locked 50 is positioned facing the locking portion 60, and the lock pin 52 biased by the spring 54 protrudes toward the locking portion 60 to be inserted into the accommodating portion 62 of the locking portion 60. This locks sliding of the slide door 6 in the fully closed position.

As described in the foregoing, the vehicle door structure 1 includes the lock mechanism 40 that locks sliding of the slide door 6 in the fully closed position and in the fully open position. The lock mechanism 40 includes the portion to be locked 50 provided to the guided body 18 and the locking portions 60 and 70 provided to the middle slide rail 17. The portion to be locked 50 protrudes toward the locking portions 60 and 70 and is locked by the locking portions in the fully closed position and in the fully open position. In the vehicle door structure 1, this configuration enables the slide door 6 to be locked in the fully closed position and in the fully open position by the portion to be locked 50 provided to the guided body 18 and the two locking portions 60 and 70 provided to the middle slide rail 17, even without providing individual lock mechanisms arranged in the fully closed position and the fully open position of the slide door 6 and each containing a latch and a striker. Thus, in the vehicle door structure 1, the number of components can be reduced. Consequently, the manufacturing cost reduction and the weight reduction can be achieved.

Conventionally, when the fitting position of the slide door with respect to the slide rail in the fully closed position is adjusted, adjustment of the guided body and adjustment of the lock and the striker are required. By contrast, in the vehicle door structure 1, adjustment is required only for the guided body 18, and thus the fitting position can be easily adjusted.

In the present embodiment, the portion to be locked 50 includes the lock pin 52 having a rod shape and provided so as to be capable of protruding and retracting and a spring 54 configured to bias the lock pin 52 toward the locking portions 60 and 70. By this configuration, the lock pin 52 can be caused to protrude toward the locking portions 60 and 70, whereby engagement between the portion to be locked 50 and each of the locking portions 60 and 70 can be further ensured. Consequently, sliding of the slide door 6 can be securely locked.

In the present embodiment, the guided body 18 includes the vertical roller 21 and the horizontal rollers 22 and 23. The lock pin 52 is provided so that part thereof is positioned inside the hollow support member 26 rotatably supporting the vertical roller 21 and the extending direction thereof is aligned along the rotation axis L of the vertical roller 21, so as to be capable of protruding and retracting along the rotation axis L. In this configuration, the position of the guided body 18 in the middle slide rail 17 is regulated by the vertical roller 21 and the horizontal rollers 22 and 23. This can reduce variations in relative position between the portion to be locked 50 each of the locking portions 60 and 70. Thus, the portion to be locked 50 and each of the locking portions 60 and 70 can be securely engaged together, so that sliding of the slide door 6 can be securely locked.

In the present embodiment, the portion to be locked 50 retracts in accordance with operation of the lock pin 52 and the slide-door outer door handle 8 or the slide-door inner door handle 9 configured to control opening and closing of the slide door 6 and is released from the locked state with each of the locking portions 60 and 70. This enables locking of sliding of the slide door 6 to be released by operating the slide-door outer door handle 8 or the slide-door inner door handle 9.

In the present embodiment, the vehicle door structure 1 includes the slide door 6 and the swing door 7. In this configuration including the swing door 7, the swing door 7 is opened in the fully open position of the slide door 6. This requires sliding of the slide door 6 to be restricted in the open state of the swing door 7. In the vehicle door structure 1, even with a configuration including the swing door 7, sliding of the slide door 6 in the open state of the swing door 7 can be locked by the lock mechanism 40.

The present invention is not limited to the above-described embodiment. For example, in the above-described embodiment, a mode has been described as one example, in which the lock pin 52 of the portion to be locked 50 protrudes and retracts to be locked by each of the locking portions 60 and 70. However, the mode in which the portion to be locked 50 and each of the locking portions 60 and 70 are locked together is not limited to this.

Figure 9:
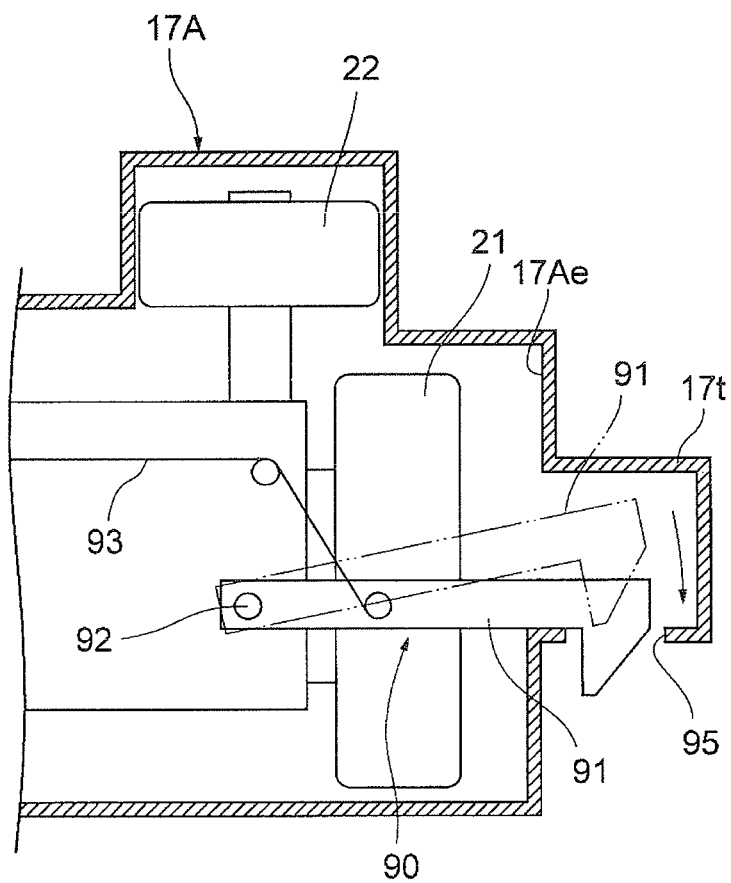
FIG. 9 is a diagram schematically illustrating a lock mechanism of a vehicle door structure according to another embodiment.

FIG. 9 is a diagram schematically illustrating a lock mechanism of a vehicle door structure according to another embodiment. As depicted in FIG. 9, this lock mechanism 80 includes a portion to be locked 90 and a locking portion 95. The portion to be locked 90 includes a hook 91 and a linkage member 93.

The hook 91 substantially has an L-shape. The hook 91 is pivotally supported pivotally about a shaft 92 by the main body portion 20, and swings about the shaft 92. The hook 91 is biased downward by a biasing member (not depicted). A tip of the hook 91 is positioned inside a protruding portion 17*t* protruding outward from a side surface 17A*e* in the slide rail 17A. The linkage member 93 links the hook 91 to the slide-door outer door handle 8 and the slide-door inner door handle 9. The linkage member 93 is a wire, for example. When the slide-door outer door handle 8 or the slide-door inner door handle 9 is operated (opening operation is performed), the linkage member 93 pulls the hook 91 in a direction in which the hook 91 swings upward. Consequently, the hook 91 is pulled out of the locking portion 95 and thus released from locking with the locking portion 95.

The locking portion 95 is provided to the protruding portion 17*t* of the slide rail 17A. Specifically, the locking portion 95 is a hole formed on the lower surface of the protruding portion 17*t*.

In the lock mechanism 80, when the slide door 6 is in the fully closed position or the fully open position, the hook 91 protrudes to the locking portion 95 and the hook 91 is locked by the locking portion 95. This locks sliding of the slide door 6. When the slide-door outer door handle 8 or the slide-door inner door handle 9 is operated, the linkage member 93 is pulled, and accordingly the linkage member 93 raises the hook 91 upward. This pulls out the hook 91 from the locking portion 95 to release the locking between the portion to be locked 90 and the locking portion 95, thereby allowing the slide door 6 to slide.

In the above-described embodiments, a configuration including the slide door 6 and the swing door 7 has been described as one example, but the vehicle door structure may have a configuration including only the slide door 6. In the above-described embodiments, a configuration including the slide door 6 and the swing door 7 on a side portion of the vehicle body 2 has been described as one example, but the slide door 6 and the swing door 7 may be provided to a rear portion of the vehicle body 2. Alternatively, only the slide door 6 may be provided to the rear portion of the vehicle body 2.

In the above-described embodiments, a mode has been described as one example, in which the lock mechanism 40 is configured with the portion to be locked 50 provided to the guided body 18 of the slide support mechanism 11C and the locking portions 60 and 70 provided to the middle slide rail 17. However, the lock mechanism may be provided to the slide support mechanism 11A and/or the slide support mechanism 11B.

In the above-described embodiments, a mode including the vertical roller 21 and the two horizontal rollers 22 and 23 has been described as one example, but the respective numbers of vertical rollers and horizontal rollers are not limited to this.

In the above-described embodiments, the tip of the lock pin 52 having a round shape has been described as one example, but the tip of the lock pin 52 may be provided with a roller. Alternatively, at least the tip of the lock pin 52 may be coated with a wear-resistant member. The lock pin 52 slides while being pressed against the middle slide rail 17. In view of this, providing a roller to the tip of the lock pin 52 or coating the tip with a wear-resistant member can prevent wear of the lock pin 52.

In the above-described embodiments, the spring 54 has been described as one example of a member configured to bias the lock pin 52, but the member configured to bias the lock pin 52 is not limited to this. In the above-described embodiments, a mode in which the lock pin 52 is always biased toward the side surface 17*e* of the middle slide rail 17 by the biasing member has been described as one example. However, the lock pin 52 may be configured to protrude toward the locking portions 60 and 70 in the positions of the locking portions 60 and 70. For example, the lock pin 52 may be configured to protrude and retract by a cylinder driven by air or a motor, for example. Alternatively, a configuration may be used in which operation of the slide-door outer door handle 8 and the slide-door inner door handle 9 is detected, and the lock pin 52 (hook 91) is moved based on detection signals therefrom.

In the above-described embodiments, a mode in which each of the locking portions 60 and 70 includes the pair of side portion 60*a* and 60*b*, the top portion 60*c*, and flange portions 60*d* and 60*e* has been described as one example, but the configuration of the locking portions 60 and 70 is not limited to this. The locking portions 60 and 70 may have any configuration capable of locking the portion to be locked 50.

In the above-described embodiments, a mode has been described as one example, in which the axis of the lock pin 52 and the rotation axis L of the vertical roller 21 are arranged on the same axis and the lock pin 52 is provided so as to be capable of protrude and retract along the rotation axis L. However, the lock pin 52 may have an axis extending along the rotation axis of the horizontal roller 22 (have the same axis as the rotation axis of the horizontal roller 22), and may be configured to protrude upward or downward along the rotation axis of the horizontal roller 22. The point is that any configuration may be used in which the lock pin 52 (locking portion) protrudes toward the portion to be locked provided to the slide rail.

What is claimed is:

1. A vehicle door structure comprising:
   a slide door configured to open and close a door opening portion formed on a vehicle body;
   a slide mechanism including a slide rail provided extending in an opening direction of the slide door and a guided body guided by the slide rail, the slide mechanism being configured to slide the slide door; and
   a lock mechanism configured to lock sliding of the slide door in a fully closed position in which the slide door closes the door opening portion and in a fully open position in which the slide door fully opens the door opening portion, wherein
   the lock mechanism comprises:
      a portion to be locked provided to the guided body; and
      two locking portions provided to the slide rail and each having a same configuration and arranged at a position that corresponds to the portion to be locked when the slide door is positioned in the fully closed position or the fully open position,
   the portion to be locked protrudes toward one of the locking portions and the locking portions each have a configuration to accommodate the protrusion of the portion to be locked, thereby the portion to be locked is locked by the accommodation by the corresponding one of the locking portions in the fully closed position or the fully open position.

2. The vehicle door structure according to claim 1, wherein the portion to be locked comprises:
   a member to be locked having a rod shape and provided so as to be capable of protruding and retracting; and
   a biasing member configured to bias the member to be locked toward the locking portions.

3. The vehicle door structure according to claim 2, wherein the guided body comprises a roller rotatably supported by a support member that has a hollow and configured to move along the slide rail, and
   the member to be locked is provided so that at least part of the member to be locked is positioned inside the support member and an extending direction of the member to be locked is aligned along a rotation axis of the roller, so as to be capable of protruding and retracting along the rotation axis.

4. The vehicle door structure according to claim 1, wherein the portion to be locked retracts in accordance with operation of an operating portion configured to control opening and closing of the slide door and is released from a locked state with each of the locking portions.

5. The vehicle door structure according to claim 1, wherein
   the slide door opens and closes one partial area of the door opening portion,
   the vehicle door structure further comprises a swing door configured to open and close a second partial area of the door opening portion together with the slide door that is in the fully open position, and
   the slide rail is arranged on the swing door.

* * * * *